(12) United States Patent
Kolze

(10) Patent No.: US 7,136,435 B2
(45) Date of Patent: Nov. 14, 2006

(54) MODIFIED BRANCH METRICS FOR PROCESSING SOFT DECISIONS TO ACCOUNT FOR PHASE NOISE IMPACT ON CLUSTER VARIANCE

(75) Inventor: Thomas J. Kolze, Phoenix, AZ (US)

(73) Assignee: Broadcom Corporation, Irvine, CA (US)

(*) Notice: Subject to any disclaimer, the term of this patent is extended or adjusted under 35 U.S.C. 154(b) by 976 days.

(21) Appl. No.: 10/112,009

(22) Filed: Mar. 30, 2002

(65) Prior Publication Data

US 2003/0185319 A1    Oct. 2, 2003

(51) Int. Cl.
   H03D 1/00      (2006.01)
   H03D 3/00      (2006.01)

(52) U.S. Cl. .................. 375/341; 375/265; 375/317; 375/322; 714/796

(58) Field of Classification Search .............. 375/316, 375/317, 265, 341; 714/796
   See application file for complete search history.

(56) References Cited

U.S. PATENT DOCUMENTS 5,710,793 A * 1/1998 Greenberg ................. 375/232
6,005,893 A * 12/1999 Hyll .......................... 375/260
6,167,095 A * 12/2000 Furukawa et al. .......... 375/285
6,396,803 B1 * 5/2002 Hornsby et al. ............ 370/208
6,463,106 B1 * 10/2002 Prasanna .................... 375/316

* cited by examiner

Primary Examiner—Kevin Kim
(74) Attorney, Agent, or Firm—Garlick Harrison & Markison; Shayne X. Short

(57) ABSTRACT

Modified branch metrics for processing bit-soft decisions to account for phase noise impact on cluster variance (CV). The present invention is able to partition a modulation scheme's constellation into two or more regions, so that the bit-soft decision branch metrics may be adjusted based on the CV of the various constellation points. A confidence level may be attached to the various constellation points based on their particular CVs. There are a number of methods to ascertain the CV of the constellation's points, including finding characteristics of various components in a communication system (transmitter, communication channel and receiver), and any method may be used within various embodiments. The modification of the branch metrics/confidence level may be performed in a communication receiver; the communication receiver may be implemented in a communication system employing the vector orthogonal frequency division multiplexing (VOFDM) portion of the broadband wireless internet forum (BWIF).

57 Claims, 11 Drawing Sheets

MODIFIED BRANCH METRICS FOR PROCESSING SOFT DECISIONS TO ACCOUNT FOR PHASE NOISE IMPACT ON CLUSTER VARIANCE

CROSS REFERENCE TO RELATED APPLICATIONS

The following U.S. Utility patent applications are hereby incorporated herein by reference in their entirety and made part of the present U.S. patent application for all purposes:

1. U.S. Utility patent application Ser. No. 10/109,978, entitled "OPTIMAL DECISION METRIC APPROXIMATION IN BIT-SOFT DECISIONS," (Attorney Docket No. BP1978), filed Saturday, Mar. 30, 2002, pending.

2. U.S. Utility patent application Ser. No. 10/112,128, entitled "FREQUENCY DRIFT AND PHASE ERROR COMPENSATION IN A VOFDM RECEIVER," (Attorney Docket No. BP1979), filed Mar. 30, 2002, pending.

3. U.S. Utility patent application Ser. No. 10/112,567, entitled "CHARACTERIZING CHANNEL RESPONSE IN A SINGLE UPSTREAM BURST USING REDUNDANT INFORMATION FROM TRAINING TONES," (Attorney Docket No. BP1981), filed Saturday, Mar. 30, 2002, pending.

4. U.S. Utility patent application Ser. No. 10/114,023, entitled "VOFDM RECEIVER CORRELATION MATRIX PROCESSING USING FACTORIZATION," (Attorney Docket No. BP1982), filed Mar. 30, 2002, now U.S. Pat. No. 6,947,715, issued on Sep. 20, 2005.

BACKGROUND

1. Technical Field

The invention relates generally to communication systems; and, more particularly, it relates to a system and method that are operable to perform modification of branch metrics/decision metrics for processing bit-soft decisions to account for phase noise impact on cluster variance.

2. Related Art

Communication systems transmit digital data through imperfect communication channels. These symbols may undergo some undesirable corruption due to the imperfection of the communication channel. One effort to try to avoid such situations is focused on performing forward error correction (FEC) coding. However, there is typically some difficulty in extracting the information contained within these symbols after they have been undesirably altered within the communication channel. There exist some methods that seek to curb the effect that the communication channel has had on the data; one such method includes employing using Decision Feedback Equalizers (DFEs). However, even after the incoming signal has been equalized, the extraction of the data, that has undergone some alteration due to the channel effects, is still a probabilistic determination.

Many communication systems, particularly in a receiver, need to perform the analog to digital transformation of an incoming signal. In doing so, there is oftentimes an uncertainty in whether a sample of the incoming analog signal is properly transformed into a 1 or a 0 in the digital realm; for example, there is not a 100% certainty that an incoming signal is actually a 1 or actually a 0—there is some probability associated with the decision. In higher-level encoding/decoding systems, e.g., QPSK/4 QAM, 16 QAM, 64 QAM, 256 QAM, and 1024 QAM etc., there are several bits per symbol that need to be transformed to either a 1 or a 0.

In 16 QAM applications, a receiver extracts 4 bits of data from each symbol. In the QAM modulation scheme, each symbol includes an in-phase component and a quadrature component. For the 16 QAM modulation type, the decision block maps the in-phase and quadrature components contained in the symbol to a 16 QAM constellation and decides the values of the four bits that are carried by the symbol. Within these various systems, the constellation points that are used to modulate/demodulate the data do not all have identical cluster variances (CVs).

The decisions made in extracting bits from a particular symbol are referred to as "bit-soft decisions." Bit-soft decisions not only map the symbol into bits but also produce a decision metric/branch metric related to the probability that the decision was correct based upon how well the received, in-phase, and quadrature voltages of a symbol correspond to the symbol in the constellation. The terminology of "branch metric" is often used interchangeably with "decision metric," and this convention will be followed in this document. The decoder operates based on the premise that there are only a finite number of possible states of the encoder and that given a certain number of consecutive states, the input bit may be predicted that would have caused a particular state transition. The decoder generates a "branch metric" (or "decision metric") for each of the possible "state transitions" from one state to another. The coding method maintains a "decision metric" associated with every state that is the sum of the metric at its predecessor state and the metric associated with the branch that caused the state transition. This metric may be termed the cumulative metric or accumulated metric, and the decoder generates the cumulative metric for all of the states. The different states and the transition from one state to another can be represented in a diagram, namely, a trellis diagram. For various possible allowable state transition sequences through the trellis (the allowable paths through the trellis), the decision metric associated with the sequence of branches of the trellis diagram are summed together, and the smallest sum is selected as the actual state transition and enables the identification of the best estimate of the decoded data. It is also noted, without loss of generality, the sign of the metrics may also be changed so that the largest sum would be the best estimate.

As mentioned above, the constellation points that are used to modulate/demodulate the data do not all have an identical cluster variances (CVs). Conventional and prior art commonly calculate the cluster variances of points within the constellations used to demodulate received data. Oftentimes, the cluster variance of the constellation points closer to the origin of the constellation is tighter than those further out from the constellation's origin for the same signal to noise ratio (SNR), particularly for higher SNR where phase noise is significant, and the larger energy constellation points are further from the constellation's origin.

Some communication systems are particularly susceptible to phase noise in the signal. When a communication receiver demodulates the data, the phase noise can be problematic, in that, the various points in the constellation may have significantly different cluster variances. In some communication systems, such as multi-tone modulation formats, the degradation of a transmitted signal, due to phase noise, is increased by the interaction of the various tones within the transmitted signal. Phase noise may also be introduced by inadequacies in the sampling portions of the receiver, including phase noise inherent in the generation of the LO (local oscillator) used for down-converting from the transmission frequency. (Similarly, phase noise is introduced at the transmitter as well.) In higher order modulation types such as 16 QAM, 64 QAM, etc., this phase noise has a large impact on the mapping of symbols into the constellations. Phase noise will often cause outer-constellation points to have a greater cluster variance than inner-constellation points for an equal phase noise contribution, again, in a situation where the SNR is relatively high. To illustrate this situation in one embodiment: for a 16 QAM implementation, outer constellation points will typically suffer nine times as large of a cluster variance (three times standard deviation) for a same amount of phase noise as compared to the inner constellation points. The bit soft decisions that are generated and provided to a decoder are ultimately significantly affected by any introduction of this phase noise.

Further limitations and disadvantages of conventional and traditional systems will become apparent to one of skill in the art through comparison of such systems with the invention as set forth in the remainder of the present application with reference to the drawings.

SUMMARY OF THE INVENTION

Various aspects of the invention can be found in a communication receiver that is operable to adjust one or more soft decision metrics based on a cluster variance of one or more constellation points within a constellation plane. Any number of ways may be employed to characterize the constellation points. A cluster variance characterization circuitry is operable to characterize a constellation point within a constellation plane. The constellation point is used to demodulate and decode signals received by the communication receiver. The communication receiver calculates a bit-soft decision metric to assist in the demodulation and decoding of the received signal. The communication receiver adjusts the bit-soft decision metric based on the characterization of the constellation point within the constellation plane.

The constellation plane may be partitioned into any number of regions or into no regions. The communication receiver may be implemented having intelligence so that when there is no substantial differentiation between the various constellation points, as would be the case if additive thermal noise were dominant, then the communication receiver does not adjust the one or more soft decision metrics based on the constellation's cluster variance. It is noted that the constellation symbol soft decisions may be parsed into bit-soft decisions. Just as the constellation symbol soft-decisions are adjusted, the bit-soft decisions derived from the symbol-soft decisions may also be adjusted to account for phase noise. The regions may be arranged such that they appear as concentric circles extending from the origin of the constellation plane, and each outer region substantially surrounds the region that is immediately adjacent and interior to it. However, the present invention envisions embodiments where the regions are not precisely circular in nature.

The constellation plane's cluster variance may be determined using a number of ways including analytically or alternatively by using actual received data to map out the cluster variance. In some embodiments, a combination of both analytical offline analysis and real time online learning analysis are combined in one manner or another. For example, an offline-generated characterization may be used until the online learning analysis sufficiently converges on a characterization of the cluster variance of the constellation plane. The analytical characterization may also include determining one or more of a transmitter characteristic, a communication channel characteristic, and a receiver characteristic within a communication system in which the communication receiver resides. This analytical characterization of any of these various parameters may be performed offline. The communication receiver may actually consider the characterization of the cluster variance of the constellation point within the constellation plane when it calculates the soft decision metric; alternatively, the characterization of the cluster variance of the constellation point within the constellation plane may be used to adjust an earlier calculated soft decision metric.

The present invention may be implemented in any communication receiver that seeks to map received data symbols to constellation points. One such example is the 16 QAM coding scheme. However, there are other coding schemes that may also be employed without departing from the scope and spirit of the invention including QPSK, 64 QAM, 256 QAM, and 1024 QAM. The communication receiver may include a wireless modem indoor unit. The communication receiver may employ the vector orthogonal frequency division multiplexing (VOFDM) portion of the broadband wireless internet forum (BWIF). It is also noted that the present invention would benefit any multi-tone modulation scheme. Moreover, the present invention is also applicable to single carrier modulation schemes and any modulation scheme with constellation points of differing energy levels.

The present invention may be applied to single carrier QAM. In this case, the invention may/may not include an enhancement, accounting for the fact that the predominance of the cluster variance attributable to phase noise is in quadrature to the radius vector extending from the constellation origin to a constellation point. By contrast, in some multi-tone systems, such as VOFDM, the cluster variance induced by phase noise is symmetric about a constellation point.

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
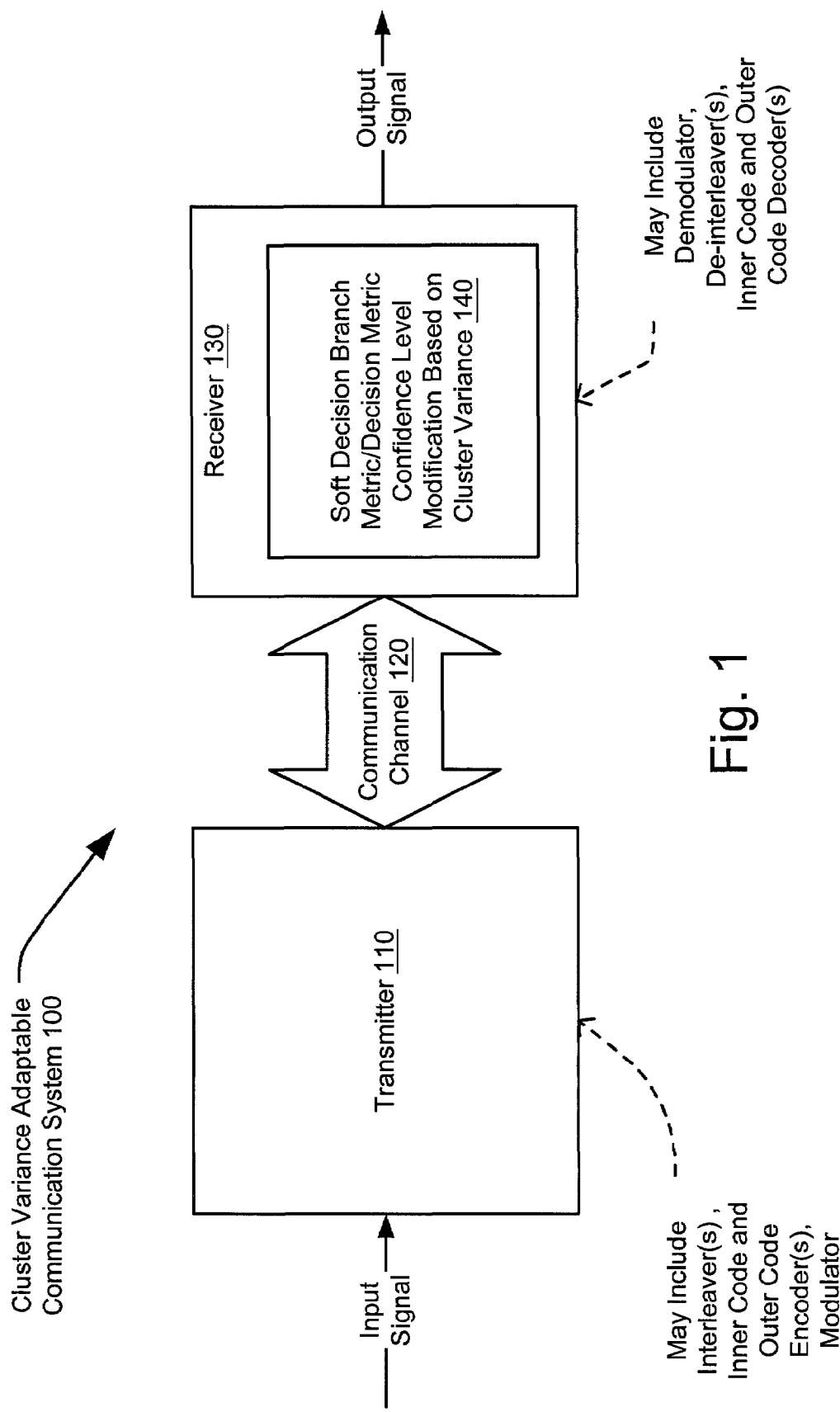
FIG. 1 is a system diagram illustrating an embodiment of a cluster variance adaptable communication system that is built in accordance with certain aspects of the present invention.

The present invention is operable within any two-dimensional (2-D) constellation mapping to perform demodulation. Certain constellation mappings are more readily amenable to finding bit mappings that are useful, such as square constellation mappings, yet the present invention may be implemented within any constellation whose constellation points may potentially have different cluster variances (CVs) within various regions within the constellation based on any number of parameters, including the introduction of phase noise within a received signal, that may be caused by the communication channel over which a signal is transmitted, and also by various components within the transmitter and receivers themselves. Based upon the variations of the CVs of the constellation points, the present invention is able to adjust/modify the branch metrics/decision metrics used to make bit-soft decisions. While some prior art communication systems do in fact calculate the CV of the received constellation points, they do not differentiate between various regions within the constellation and treat those constellation points differently. There are a number of ways to characterize the CV of constellation points, and the present invention envisions any method for doing so to effectuate the various aspects of the present invention. Once the CV of the constellation points is determined, using any one of various ways, as will be described within the description, then a confidence level may be attached to that constellation point so that the associated branch metric/decision metric (BM/DM) may be adjusted.

The present invention is operable within the vector orthogonal frequency division multiplexing (VOFDM) portion of the broadband wireless internet forum (BWIF) standard set. The VOFDM standard defines the physical layer and additional layers in which a plurality, e.g., up to 1,024 separate carriers (tones) carry either data (data tones) or pilot signals (pilot tones). The 1,024 tones are separated in frequency such that they are orthogonal to one another. The VOFDM standard also defines a multi-antenna receive path that combines the signal received via each of the antennae using a combining methodology.

VOFDM operations, due to the spacing of the pilot tones and the data tones is subject to significant phase noise. This degradation due to phase noise is primarily caused by the interaction of the various orthogonal data tones and pilot tones. Phase noise may be introduced by a number of factors, some of which are mentioned above; other factors include inadequacies in the sampling portions of the receiver, including phase noise inherent in the generation of the LO (local oscillator) used for down converting from the transmission frequency. Similarly, phase noise may be introduced at the transmitter as well, or even within the communication channel over which data are transmitted. In higher order modulation types such as 16 QAM, 64 QAM, 256 QAM, 1024 QAM, etc., this phase noise has a large impact on the mapping of symbols into the constellations. Again, phase noise will cause outer-constellation points to have a greater cluster variance than the inner-constellation points for a substantially comparable phase noise contribution. Typically, for a 16 QAM implementation, outer constellation points will suffer nine times as large a cluster variance (three times standard deviation) for a comparable amount of phase noise as compared to inner constellation points.

Bit soft decisions may be significantly affected by this phase noise. The present invention provides a manner in which the variation of the CVs may be accommodated so as to adjust a confidence level for use in bit soft decision-making. In accordance with the present invention, different decision metrics (bit soft decisions) are applied to the various constellation points to account for the differing impact of phase noise on the inner constellation points as compared to the outer constellation points. In one embodiment, the constellation is divided into two different regions, and the constellation points in those points are handled differently; in higher order modulation schemes, there may be a number of regions into which the constellation is partitioned. By using these differing decision metrics in the decision making process, better decision characteristics will result for use in subsequent decoding operations.

The functionality of the functional blocks described below in the various embodiments of the present invention may be implemented using hardware circuitry and software (supported on some platform) and/or a combination of hardware and software.

FIG. 1 is a system diagram illustrating an embodiment of a cluster variance adaptable communication system 100 that is built in accordance with certain aspects of the present invention. The cluster variance adaptable communication system 100 includes a transmitter 110, a communication channel 120, and a receiver 130. The transmitter 110 takes an input signal and performs any necessary modulation, encoding, and/or interleaving and then prepares that signal for transmission to the receiver 130 via the communication channel 120. It is noted that the transmitter 110 may include modulators, outer code encoders, inner code encoders, and interleavers; the receiver 130 may include demodulators, inner code decoders, outer code decoders, and de-interleavers.

The receiver 130 performs soft decision branch metric/decision metric confidence level modification based on cluster variance (CV), as shown in a functional block 140. The CV of the various constellation points may be determined using a number of manners, several of which are described within this patent application. There are also many manners in which to partition the constellation points without departing from the scope and spirit of the invention. After ensuring the branch metrics/decision metrics are appropriately modified, based on the CV of the constellation points that are employed, then the bit-soft decisions may be actually made using these modified branch metrics. Alternatively, the bit-soft decisions may be made first, and then those bit-soft decisions may be skewed/adjusted based on the confidence levels associated with the constellation points used to make those bit-soft decisions. The receiver 130 then generates an output signal that represents a best estimate of the original input signal that is provided to the transmitter 110; the output signal represents the actual data that the receiver 130 extracts from the signal it receives from the transmitter 110 via the communication channel 120.

It is also noted that each of the transmitter 110 and the receiver 130 may themselves be contained within transceivers without departing from the scope and spirit of the invention; that is to say, each of the transmitter 110 and the receiver 130 may be included within similar types of device (transceivers) so that both ends of the communication channel 120 may perform the functionality described in the functional block 140.

A predetermined set of equations may be employed to perform the soft decision branch metric/decision metric confidence level modification based on CV according to the present invention. The following equations may be employed to do so. First, we establish a certain number of definitions that may be used within the calculations.

$\sigma_\alpha^2$ = data constellation average power $$\sigma_n^2 = \frac{\sigma_a^2}{(E_s/N_o)} = \text{thermal noise}$$

$$\sigma_\phi^2 = \int_0^\infty S_\phi(f)/|\text{sinc}(f)|^2 \, df =, \text{where}$$

$S_\phi(f)$ = phase noise power spectral density where its units [rad$^2$/Hz], and sinc(f) = sinc function with nulls spaced equal to data tone spacing $(\sigma_\phi^2)^*$ = additional phase noise thrown onto a data tone adjacent to a pilot tone, when the pilot tones are larger (more power) than data tones $(\sigma_\phi^2)^{}$ = additional phase noise thrown onto a data tone midway between pilot tones, when the pilot tones are larger (more power) than data tones $(\sigma_\phi^2)^{*}$ = additional phase noise thrown onto a pilot tone, from all the other pilot tones, when the pilot tones are larger (more power) than data tones $$\Delta_a = \left|\frac{a_{pilot}}{a_{data}}\right|^2 = \text{ratio of power in a pilot tone to average power in a data tone}$$

As an example (using the definitions provided above), the equations for the variance of a constellation point, $\alpha_i$, is given for two cases:

1) the data tone is next to a pilot tone (shown below EQ. 1); and 2) the data tone is midway between pilot tones (shown below EQ. 2)

Of course, more or less specificity may be applied, as prudent in trading performance with complexity in any given application.

$$EQ.\ 1: \sigma^2 = \frac{1}{2}(\sigma_\phi^2)^* \sigma_a^2 + \frac{1}{2}(\sigma_n^2) + \frac{1}{2}(\sigma_n^2)\left(\frac{|a_i|^2}{\sigma_a^2}\right)\left(\frac{1}{\Delta_a}\right)\cdot 1 + \frac{1}{2}(\sigma_\phi^2)^{***}\sigma_a^2\left(\frac{1}{\Delta_a}\right)\cdot 1$$

$$EQ.\ 2: \sigma^2 = \frac{1}{2}(\sigma_\phi^2)^{} \sigma_a^2 + \frac{1}{2}(\sigma_n^2) + \frac{1}{2}(\sigma_n^2)\left(\frac{|a_i|^2}{\sigma_a^2}\right)\left(\frac{1}{\Delta_a}\right)\cdot\frac{1}{2} + \frac{1}{2}(\sigma_\phi^2)^{*}\sigma_a^2\left(\frac{1}{\Delta_a}\right)\cdot\frac{1}{2}$$

Figure 2:
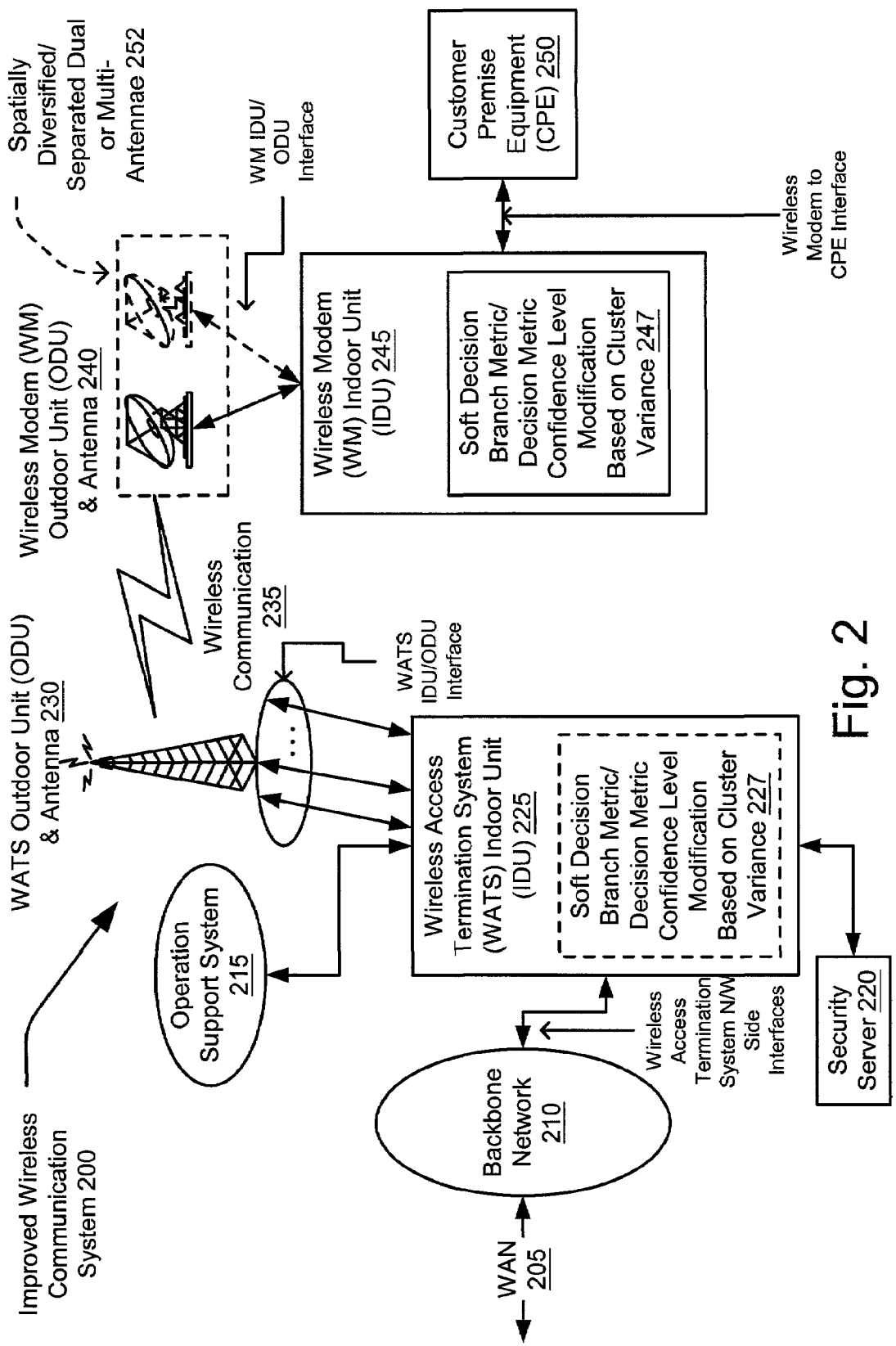
FIG. 2 is a system diagram illustrating an embodiment of an improved wireless communication system that is built in accordance with certain aspects of the present invention.

FIG. 2 is a system diagram illustrating an embodiment of an improved wireless communication system 200 that is built in accordance with certain aspects of the present invention. The present invention is operable within the improved wireless communication system 200 that employs the vector orthogonal frequency division multiplexing (VOFDM) portion of the broadband wireless Internet forum (BWIF) standard set. The VOFDM standard defines the physical layer and additional layers in which a plurality, e.g., up to 1,024 separate carriers (tones) carry either data (data tones) or training/pilot signals (training/pilot tones). The 1,024 tones are separated in frequency such that they are orthogonal to one another. The VOFDM standard also defines a multiple antennae receive path that combines the signal received via each of the antennae using a combining methodology. In the receiver of a VOFDM device (sometimes referred to as a wireless modem (WM) indoor unit (IDU)), a decision block maps incoming voltage signals corresponding to a particular symbol to a modulation constellation in order to extract bits carried by the symbol.

Here, the present invention is operable to provide for improved decoding of the received voltage signal that is provided to a wireless modem (WM) indoor unit (IDU) 245; soft decision branch metric/decision metric confidence level modification based on the cluster variance (CV) of constellation points (as shown in functional block 247) is performed within the WM IDU 245, as necessary, to ensure proper demodulation/decoding of the signals received by the WM IDU 245. It is also noted that soft decision branch metric/decision metric confidence level modification based on the CV of constellation points (as shown in functional block 227) is performed within the wireless access termination system (WATS) indoor unit (IDU) 225, as necessary, to ensure proper demodulation/decoding of the signals received by the WATS IDU 225. The functionality offered by the present invention may be performed in both transmit/ receive paths without departing from the scope and spirit of the invention.

The improved wireless communication system 200 may be viewed in light of the wireless communication system reference architecture of the BWIF; the present invention provides for improved signal processing within the WM IDU 245. A wide area network 205 communicatively couples to a backbone network 210. The backbone network 210 in turn communicatively couples to the WATS IDU 225. The WATS IDU 225 is serviced via operation system support 215 and a security server 220. The WATS IDU 225 is operable to communicate with a WATS outdoor unit (ODU) and antenna 230 using one or more signals. The present invention implements vector orthogonal frequency division multiplexing (VOFDM) where the signal is partitioned among a number of frequencies. The WATS ODU 230 communicates with a wireless modem (WM) outdoor unit (ODU) and antenna 240 via wireless communication 235. If desired, the WM ODU and antenna 240 is implemented in a spatially diversified/separated dual or multi-antennae implementation 252. The WM ODU and antenna 240 provides the one or more signals to the WM IDU 245 that is operable to perform soft decision branch metric/decision metric confidence level modification based on the cluster variance (CV) of constellation points using the functional block 247 demodulation and decoding of received signals. The WM IDU 245 communicatively couples to a customer premises equipment (CPE) 250. The FIG. 2 shows just one embodiment where a communication system may benefit from the functionality offered by the present invention in performing soft decision branch metric/decision metric confidence level modification based on the cluster variance (CV) of constellation points.

It is also noted that the WATS IDU 225 may also support soft decision branch metric/decision metric confidence level modification based on CV of constellation points according to the present invention. Generically, any receiver device may practice the soft decision branch metric/decision metric confidence level modification based on CV of constellation points according to the present invention, and the FIG. 2 shows just one example embodiment in which the present invention may be implemented.

It is noted that the functionality offered by the present invention may be performed in both transmit/receive paths without departing from the scope and spirit of the invention, as shown by the functionality within the functional blocks 247 and 227.

Figure 3:
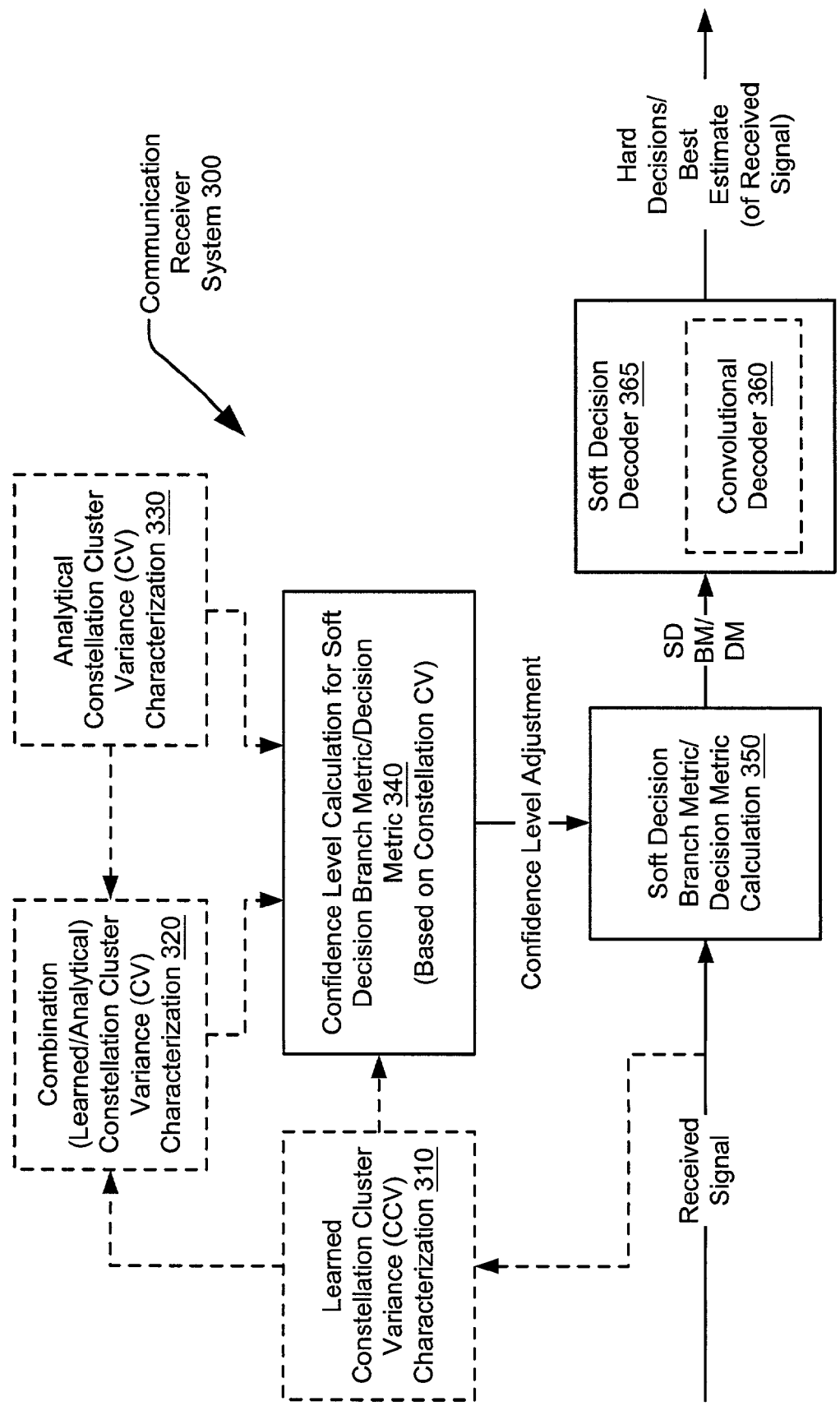
FIG. 3 is a system diagram illustrating an embodiment of a communication receiver system that is built in accordance with certain aspects of the present invention.

FIG. 3 is a system diagram illustrating an embodiment of a communication receiver system 300 that is built in accordance with certain aspects of the present invention. A received signal is provided to a functional block that performs soft decision branch metric/decision metric (SD BM/DM) calculation 350. Then, the appropriately modified SD BM/DM is provided to a soft decision decoder 365 (that may be a convolutional decoder 360 in certain embodiments) that in turn generates hard decisions/best estimate of the received signal. It is noted that the SD BM/DM may be calculated using information related to the cluster variance (CV) of the constellation points used to demodulate the received signal where this information is determined beforehand. Alternatively, there are embodiments where the SD BM/DM may be calculated first, and it may then be modified to include the effects of the CV of the constellation points. The present invention envisions the many manners in which the SD BM/DM may be adjusted using information related to the CV of the constellation points including the relative CV of constellation points in various regions of the constellation.

In alternative embodiments, the received signal is also provided to a functional block that performs learned constellation cluster variance (CV) characterization 310. This learning may be performed over a predetermined period of time in which a sufficient number of symbols are received by the communication receiver system 300 to characterize the entirety of the constellation. The period of time or number of symbols received may be user-programmed or adaptively selected in various embodiments. This learned information, relating to the CV of the constellation, is provided to a functional block that performs confidence level calculation for soft decision branch metric/decision metric (SD BM/DM) 340 that is based on the constellation's CV. This adjustment factor, or confidence level, provides for confidence level adjustment of the SD BM/DM calculation 350.

In even other embodiments, the CV characterization is may be performed analytically as shown in a functional block 330; this analytical analysis may be performed entirely off-line in certain embodiments using estimated characteristics of a communication system in which the communication receiver system resides. A variety of parameters may be used to perform this CV characterization within the functional block 330, some of which will be described below in other embodiments. This analytically learned information may be provided in alternative embodiments to the functional block 340 for use in confidence level calculation for SD BM/DM that is based on the constellation's CV.

In even other embodiments, the information derived analytically within the functional block 330 and the information that is learned in the functional block 310 may both be combined to provide for the information used to perform the confidence level calculation for SD BM/DM 340 that is based on the constellation's CV. The information derived within the functional blocks 310 and 330 are both provided to a functional block 320 in this embodiment; a combination (learned/analytical) constellation cluster variance (CV) characterization includes information that is learned and that is generated analytically. There are a number of manners in which these two inputs may be combined to provide for information to calculate the confidence level in the functional block 340.

Figure 4:
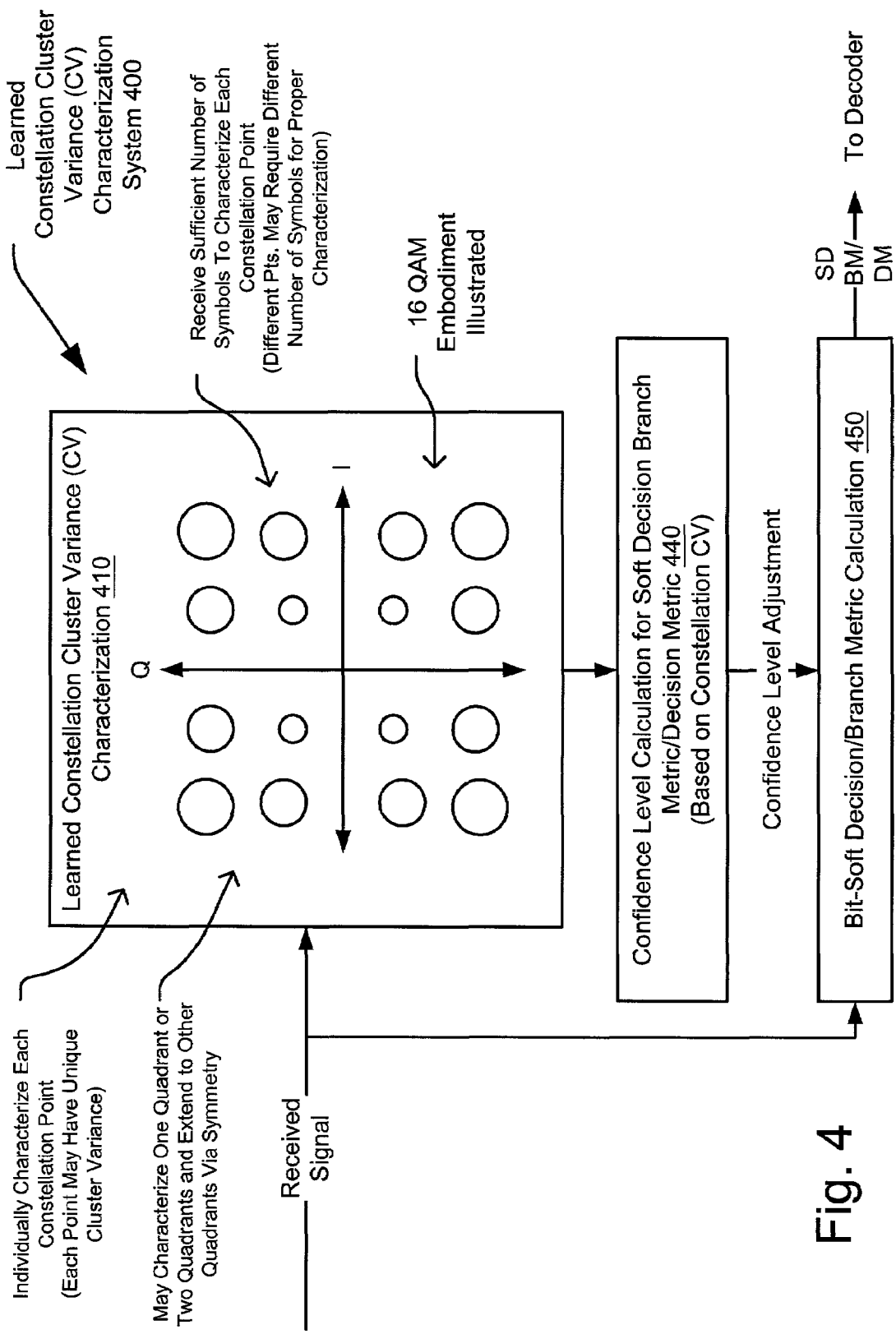
FIG. 4 is a system diagram illustrating an embodiment of a learned constellation cluster variance (CV) characterization system that is built in accordance with certain aspects of the present invention.

FIG. 4 is a system diagram illustrating an embodiment of a learned constellation cluster variance (CV) characterization system 400 that is built in accordance with certain aspects of the present invention. Here, a received signal is used to learn the CV of the constellation used to demodulate the received signal; the received signal is also provided to a functional block 450 that provides for confidence level adjustment when making the bit-soft decision metric/branch metric calculations. The functionality of the functional block 450 will also be described in more detail below. A sufficient number of symbols are received to ensure that an adequate characterization may be made. This may be determined by waiting a sufficient period of time that probabilistically will ensure that the sufficient number of symbols is received so that the constellation's CV may be characterized. A 16 QAM constellation is shown within the embodiment shown in the FIG. 4, but those persons having skill in the art will clearly appreciate that any type of constellation (having any constellation shape) may also be characterized using the learning embodiment shown here. It is also noted that different constellation points may require different numbers of symbols to ensure proper characterization of those points. If desired, each constellation point (or various regions of constellation points) may be characterized using a different number of received symbols.

Even within the learned constellation characterization embodiments, there are a variety of ways in which the CVs of the constellation points may be characterized. For example, each and every constellation point may be in fact have a unique CV. Alternatively, one quadrant, in a 2-D constellation, may be characterized and that characterization may be replicated to the other three quadrants, or two quadrants (½ of the 2-D constellation) may be characterized and that characterization may be extended to the other quadrants via the bilateral symmetry of the constellation.

Once the constellation has been characterized using the learning manner described in the FIG. 4, then this characterization is provided to a functional block 440 that calculates a confidence level for the SD BM/DM based on the constellation CV. This functional block 440 provides for confidence level adjustment when making the bit-soft decision metric/branch metric calculations in the functional block 450. The functional block 450 then outputs the SD BM/DM to a decoder that is able to generate an output signal that represents a best estimate of the original received signal.

Figure 5:
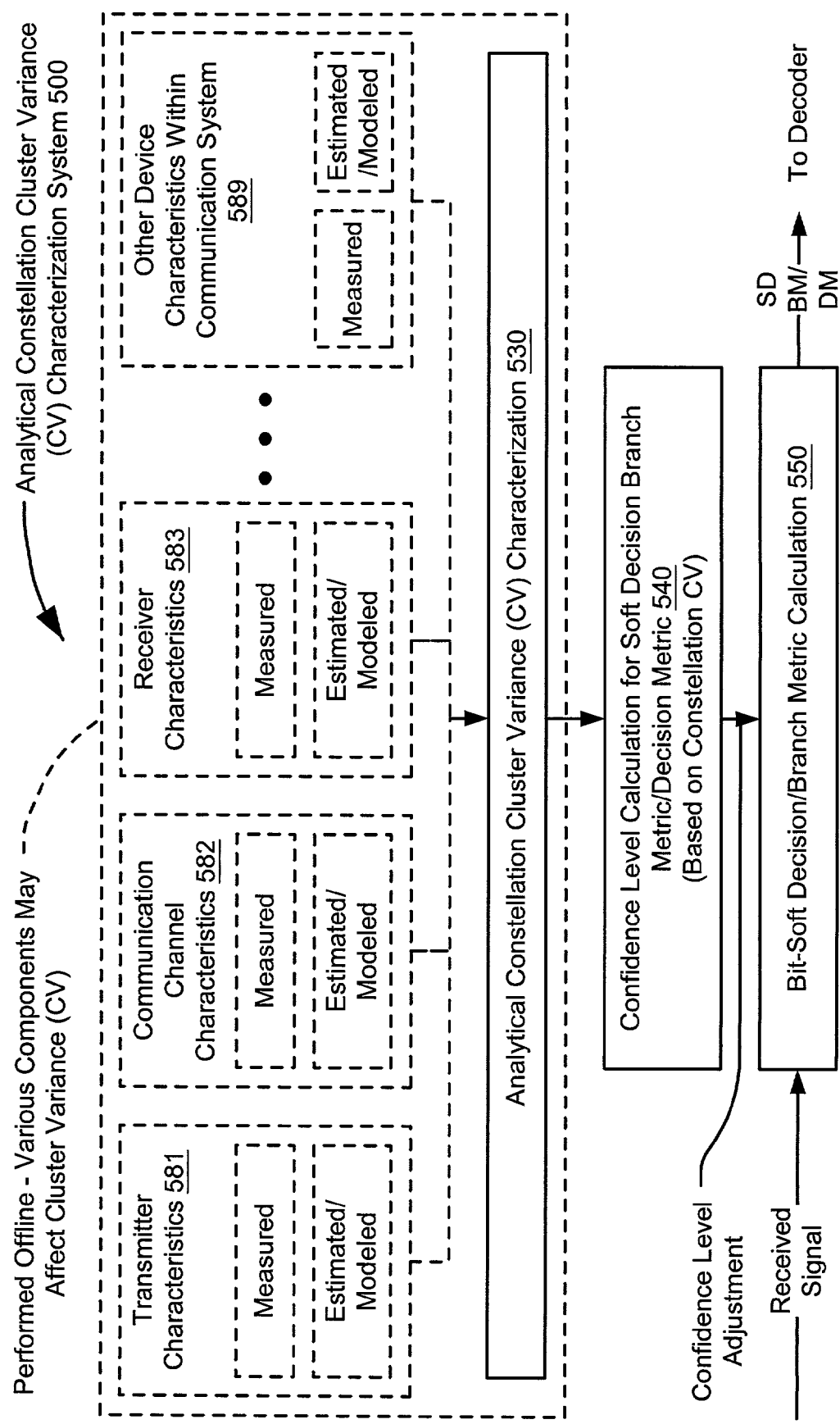
FIG. 5 is a system diagram illustrating an embodiment of an analytical constellation cluster variance (CV) characterization system that is built in accordance with certain aspects of the present invention.

FIG. 5 is a system diagram illustrating an embodiment of an analytical constellation cluster variance (CV) characterization system 500 that is built in accordance with certain aspects of the present invention. Analytical constellation CV is performed in a functional block 530. This characterization may be performed offline, and a variety of various components may be characterized to provide input to the functional block 530 where analytical constellation CV is performed. For example, transmitter characteristics may be determined as shown in a functional block 581. These transmitter characteristics may be measured or estimated/modeled. In addition, communication channel characteristics may also be determined as shown in a functional block 582. These communication channel characteristics may be measured or estimated/modeled. Receiver characteristics may also be determined as shown in a functional block 583. These receiver characteristics may be measured or estimated/modeled. In fact, the characteristics of any other device within the communication system may be characterized as shown in a functional block 589. Again, these characteristics may be measured or estimated/modeled. Again, any of the characterization performed in the functional blocks 581, 582, 583, . . . and 589. Any one or all of the information determined in these functional blocks is provided to the functional block 530 where analytical constellation CV characterization is performed.

Once the constellation has been characterized using the learning manner described in the FIG. 5, then this characterization is provided to a functional block 540 that calculates a confidence level for the SD BM/DM based on the constellation CV. This functional block 540 provides for confidence level adjustment when making the bit-soft decision metric/branch metric calculations in a functional block 550. The functional block 550 then outputs the SD BM/DM to a decoder that is able to generate an output signal that represents a best estimate of the original received signal. In this embodiment, a received signal is provided to the functional block 550. In performing the analytical characterization of the constellation within the functional block 530, the actually received signal need not be provided, as the analytical characterization may even be performed offline using estimated or modeled parameters of the communication system or any components within the communication system including the communication receiver. This may be compared to the embodiment shown above in the FIG. 4 where the received signal is provided to the functional block 410 as well as the functional block 450.

Figure 6:
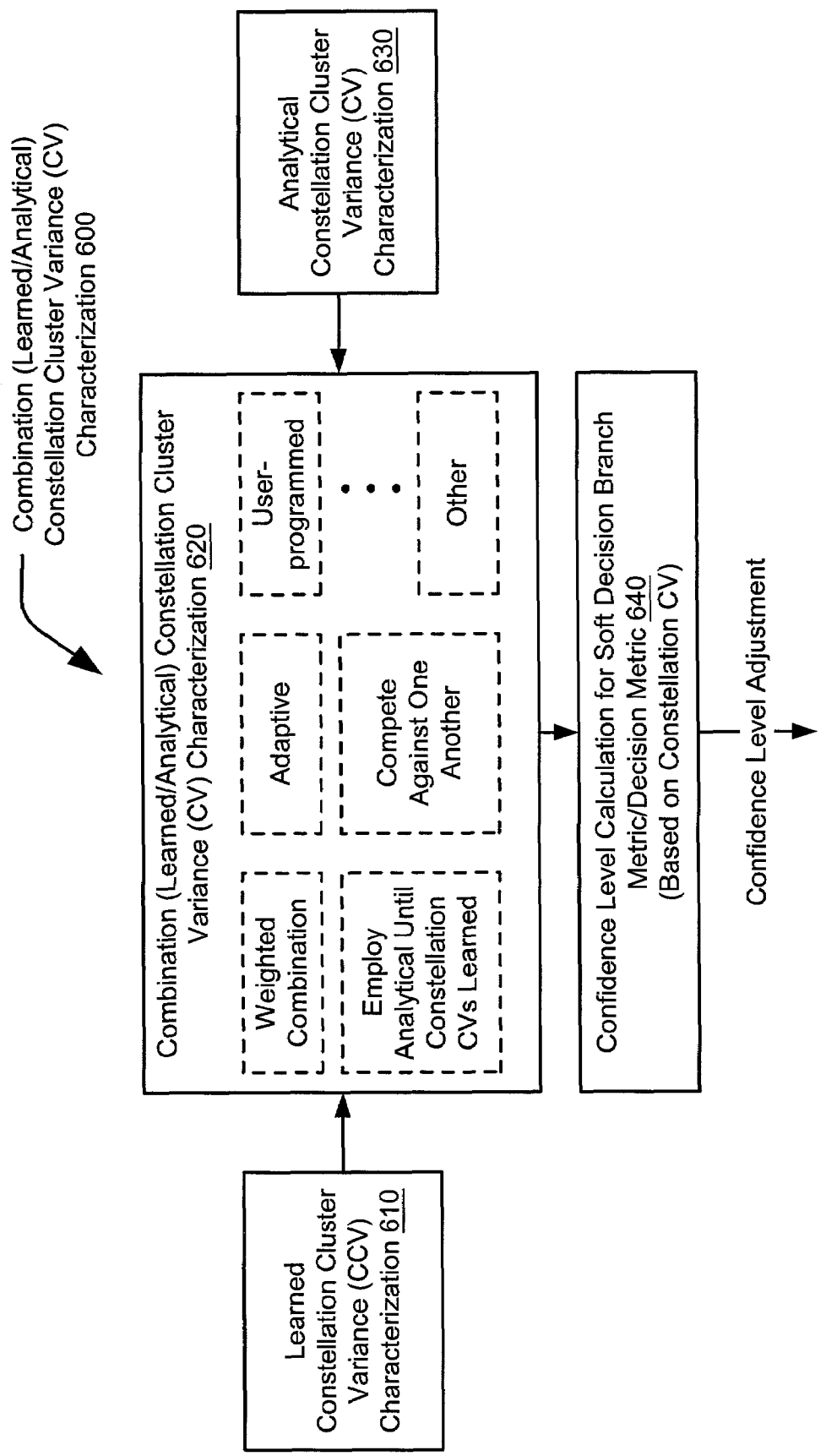
FIG. 6 is a system diagram illustrating an embodiment of a combination (learned/analytical) constellation cluster variance (CV) characterization system that is built in accordance with certain aspects of the present invention.

FIG. 6 is a system diagram illustrating an embodiment of a combination (learned/analytical) constellation cluster variance (CV) characterization system 600 that is built in accordance with certain aspects of the present invention. In this embodiment, information from both learned constellation CV characterization 610 and information from analytical constellation CV characterization 630 are provided to a functional block that combines information from both of these functional blocks, namely, a combine (learned/analytical) constellation CV characterization 620 functional block. The functional block 620 includes many manners in which information from both of these functional blocks 610 and 630 may be combined.

For example, the information may be combined using a weighted combination in which weighted factors are used to give more or less weight to the two sources of information. Alternatively, an adaptive manner may be employed in which real time analysis is made to determine which one of the functional blocks 610 and 630 should be used, or alternatively the particular relative weighting of that should be used for the two functional blocks 610 and 630.

If desired, information from the analytical functional block 630 may be used initially and until the CV of the constellation is learned using symbols of a received signal. In addition, information from the two functional blocks 610 and 630 may compete against one another and the winner, after performing some comparison, may be selected as the winner and information from that functional block may be used; alternatively, the winner may be given a greater weight in combining the information from the two functional blocks 610 and 630.

Any other of a variety of functional blocks may also be used to combine the information provided by the two functional blocks. In any of the various embodiments used to perform the combination, the combination of how information from the two functional blocks 610 and 630 should be combined may be provided by a user; it may be user-programmed in which a user selects which of the two types should be used and/or the parameters that are to be used to govern when and how information from the two functional blocks should be combined.

After this combination is made in the functional block 620, then a functional block 640 provides for confidence level calculation for use in making bit-soft decision metric/branch metric calculations. A confidence level is then output from the functional block 640. The calculation of the confidence level in the functional block 640, which may also be viewed as being an adjustment factor, is based on the CV of one or more points in the constellation.

Figure 7:
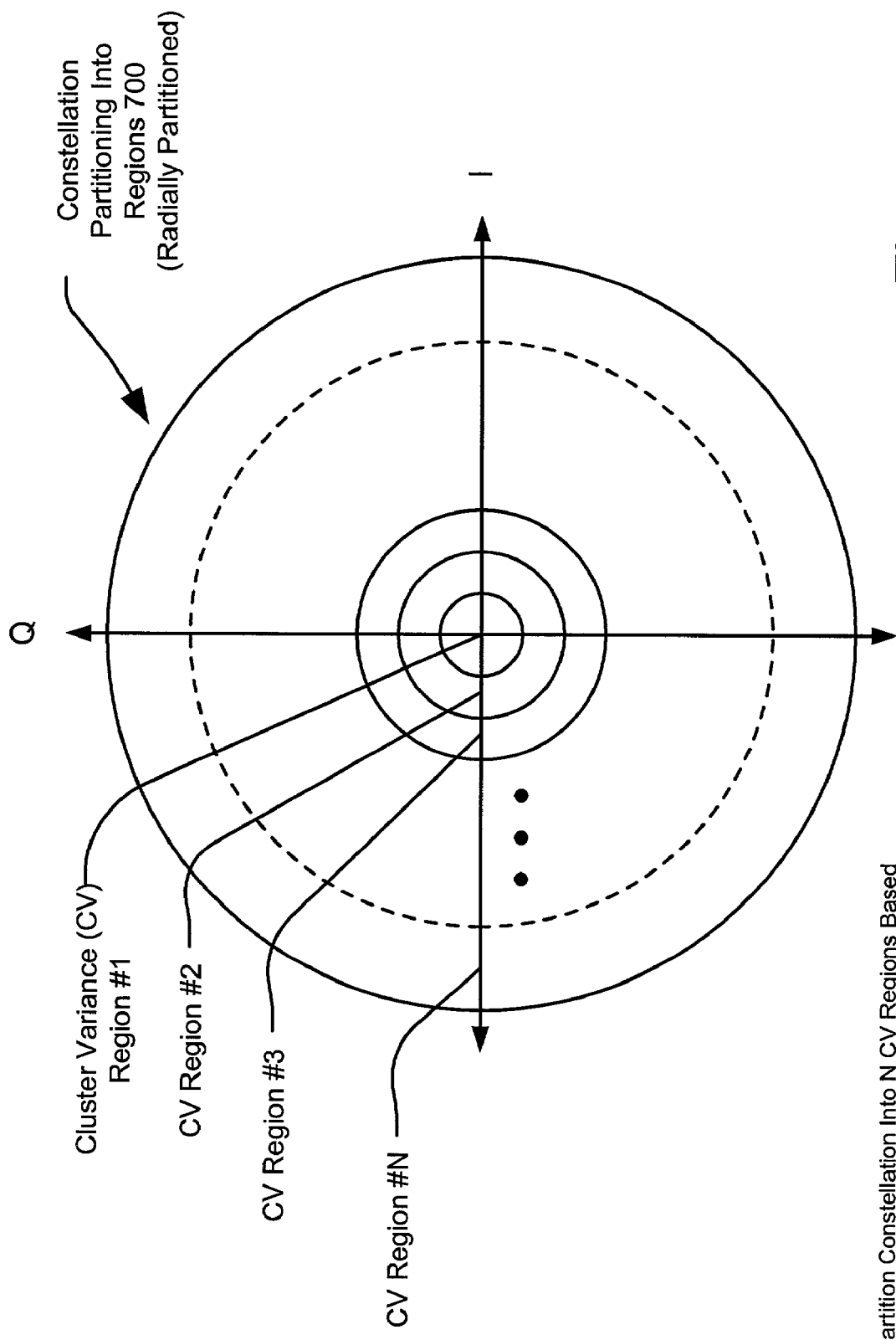
FIG. 7 is a two-dimensional constellation plane diagram illustrating an embodiment of constellation partitioning into regions that is performed in accordance with certain aspects of the present invention.

FIG. 7 is a two-dimensional constellation plane diagram illustrating an embodiment of constellation partitioning into regions 700 that is performed in accordance with certain aspects of the present invention. A two-dimensional (2-D) constellation plane having an in-phase (I) rail and a quadrature (Q) rail is shown. Extending radially from the origin of the constellation plane, the constellation plane is partitioned into N number of CV regions. The inner regions lie substantially close to the origin of the constellation plane, and the outer regions lies substantially beyond and substantially surrounds the inner regions. In this embodiment, the regions are illustrated as being substantially concentric circles extending radially from the origin of the constellation plane. In certain embodiments, the constellation plane is divided into only 2 regions; however, those persons having skill in the art will appreciate that a number of regions may be employed without departing from the scope and spirit of the invention. The partitioning of the regions of the constellation plane may be made such that each of the regions may be handled differently with respect to the confidence level adjustment. The radial partitioning is based on the premise that the higher energy constellation points are generally located further from the origin of the constellation. Phase noise typically affects the higher energy constellation points in a greater manner than those constellation points with lower energy. In addition, each constellation point typically will not have the same CV, and the closeness to the origin of the constellation will largely govern the CV. In this embodiment, those constellation points having substantially similar energies are clumped together the same region, as they will typically exhibit comparable CVs.

While the regions shown in the FIG. 7 are circular bands in shape, the present invention envisions other shapes of regions a well. For example, the shape may be square in shape, oval in shape and so on without departing from the scope and spirit of the invention. However, given the nature that phase noise typically scales with energy of the symbol, radially extending and partitioned regions will typically be an appropriate manner in which to partition the constellation plane.

Figure 8:
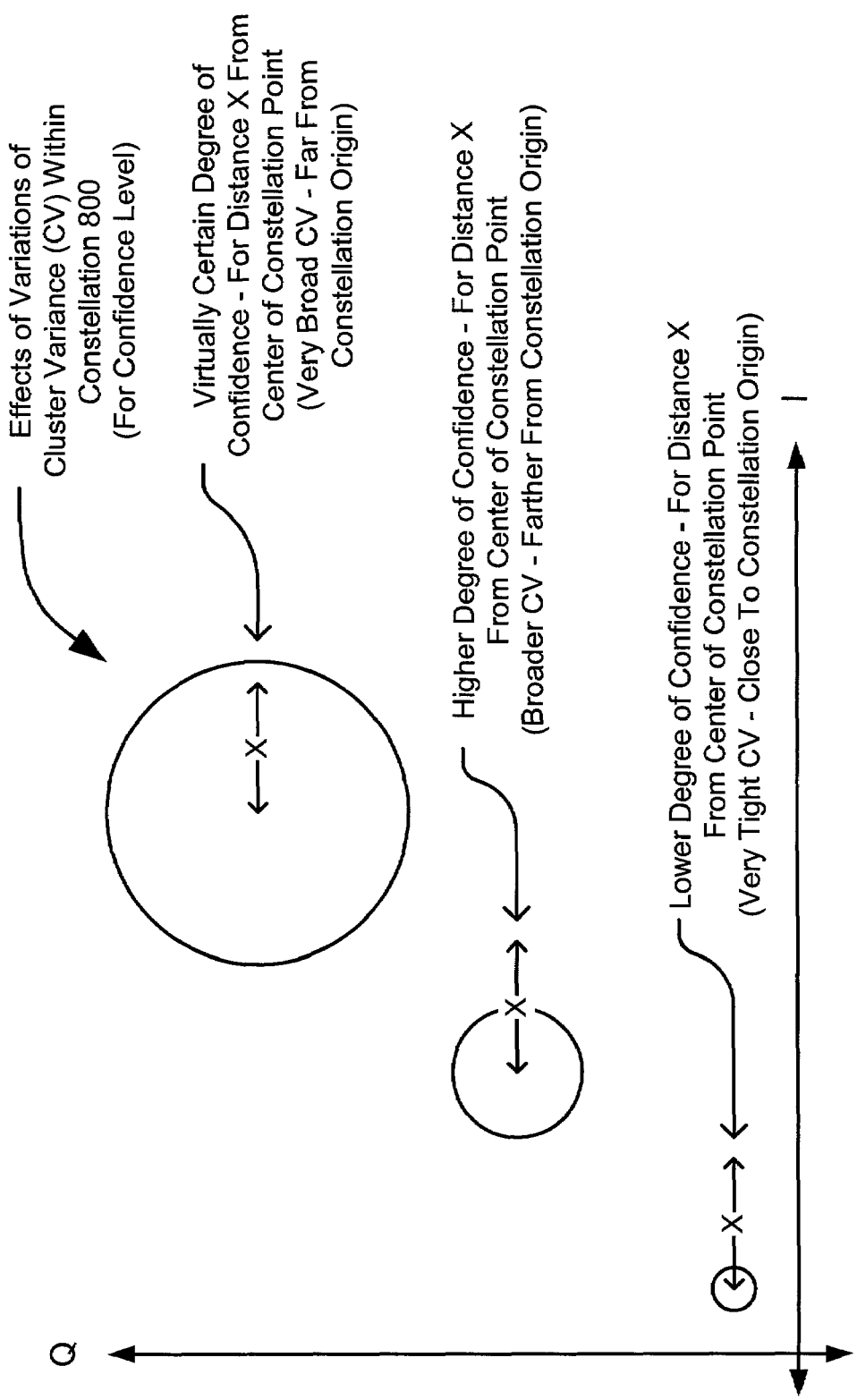
FIG. 8 is a two-dimensional constellation plane diagram illustrating effects of variations of cluster variance (CV) within a constellation.

FIG. 8 is a two-dimensional constellation plane diagram illustrating effects of variations of cluster variance (CV) within a constellation 800 and how they may govern the degree of confidence in making bit-sift decisions. This FIG. 8 shows a relative scaling in size of the CV of the constellation points based on a situation where each of the constellation points has a relatively high SNR and the noise attributed to the constellation points is substantially due to phase noise that scales with energy; in a situation where there is a relatively low SNR, the size of the constellation points would be more comparable. It is also noted that the shapes of the constellation points in the FIG. 8 are shown as being circular, but the actual shape of the constellation points may not be exactly circular as will be understood by those persons having skill in the art. For example, with single carrier QAM, the phase noise will spread in a quadrature direction to the radial line extending from the constellation origin to the constellation point.

Showing the size of the clustering for constellation points scaling in size as they are located further from the origin of the constellation plane, and using the same measurand X, as the size of the constellation point increases, a higher degree of confidence may be made at that same distance X from the center of the constellation point. For those relatively small constellation points, a lower degree of confidence may be assigned when a received symbol is demodulated and identified as being located the same distance X from the center of the constellation point. In performing decoding and demodulation, a virtually certain degree of confidence may be assigned when the distance X is even within the CV of the particular constellation point (when the distance X is less than the radius of the constellation point's CV). Based on the confidence level that a received symbol actually corresponds to a particular constellation point, then the soft decision branch metric/decision metric (SD BM/DM) may be adjusted appropriately. In some instance, the SD BM/DM may be completely unaltered as there is such a higher degree of confidence (high confidence level). In other situations, there may be a relatively low level of confidence (low confidence level) and the SD BM/DM may be adjusted significantly given that there is a relatively lower level of confidence for those particular bit-soft decisions.

Those persons having skill in the art will again appreciate that the constellation plane may be partitioned into two or more regions to deal with the various constellation points in a different manner. There may be some situation where there is no need to partition the constellation plane; for example, each of the constellation points may in fact have substantially similar CVs as in the case of relatively low SNR. In such situations, the present invention may have embedded intelligence that determines that the CVs of the constellation points does not vary substantially (say, within a threshold) and then the entire constellation plane may then be treated uniformly with no distinction between various regions of the constellation plane.

Figure 9:
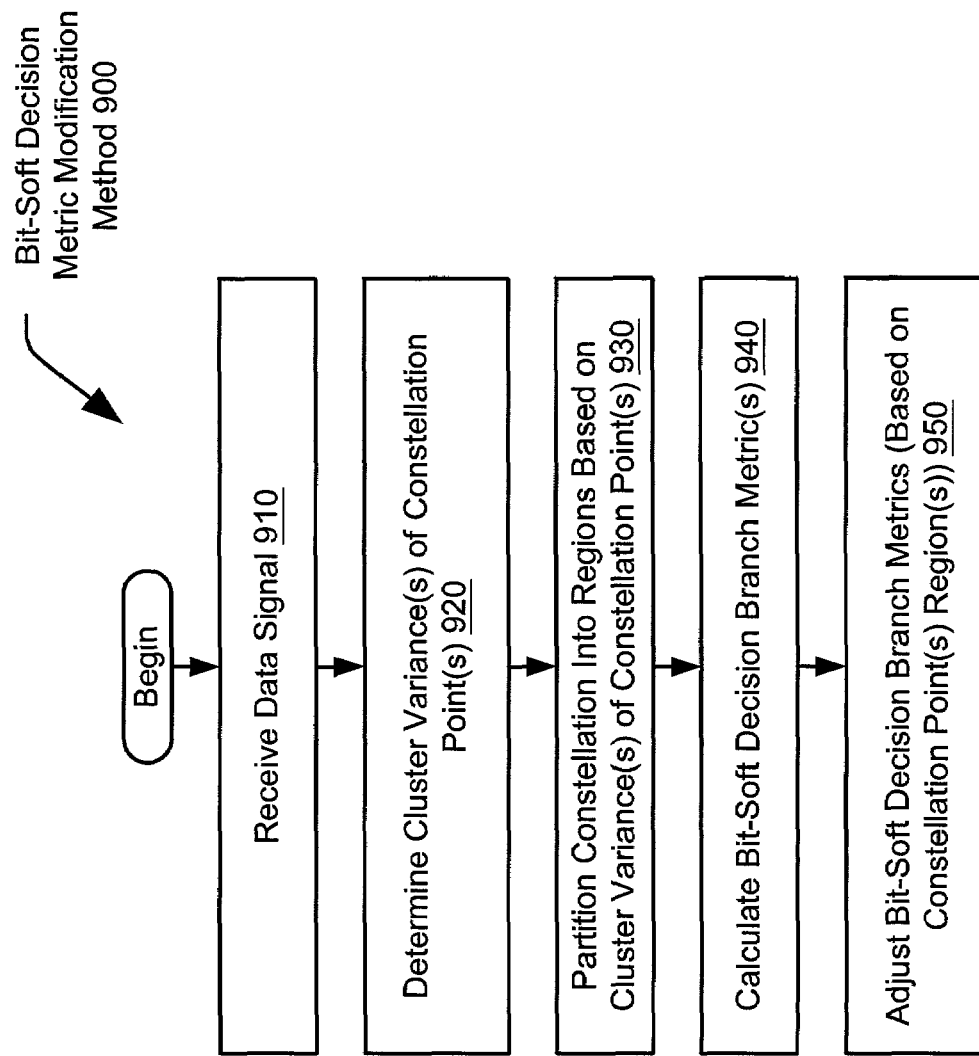
FIG. 9 is a functional block diagram illustrating an embodiment of a bit-soft decision metric modification method that is performed in accordance with certain aspects of the present invention.

FIG. 9 is a functional block diagram illustrating an embodiment of a bit-soft decision metric modification method 900 that is performed in accordance with certain aspects of the present invention. In a block 910, a data signal is received. Then, in a block 920, one or more CVs of one or more constellation points is determined; the CV of the constellation is characterized in the block 920. Based upon the characterization of the constellation points, the constellation is partitioned into a number of regions in a block 930. In a block 940, one or more bit-soft decision metrics are calculated. Ultimately, in a block 950, the bit-soft decisions (calculated in the block 940) are adjusted based on the region in which the constellation points reside.

Figure 10:
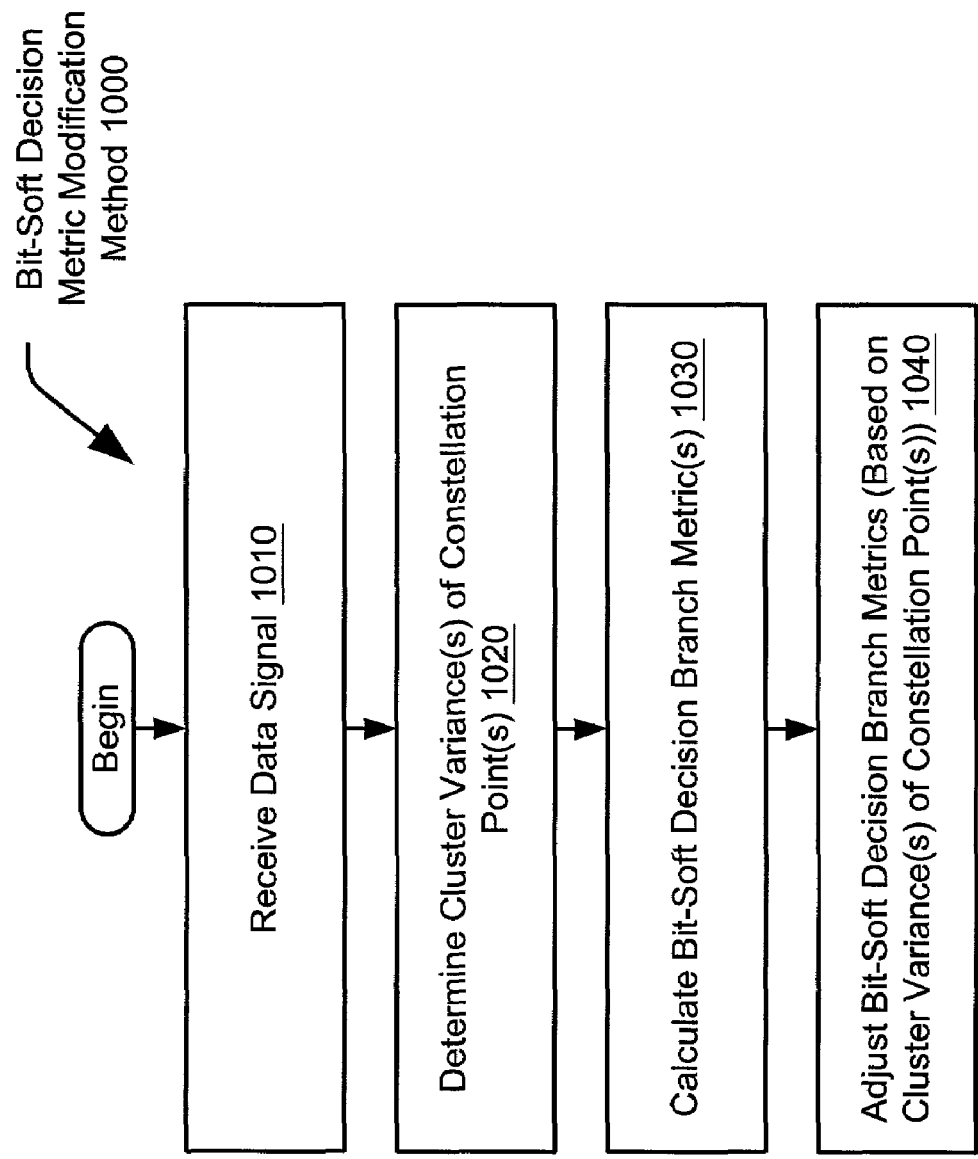
FIG. 10 is a functional block diagram illustrating another embodiment of a bit-soft decision metric modification method that is performed in accordance with certain aspects of the present invention.

FIG. 10 is a functional block diagram illustrating another embodiment of a bit-soft decision metric modification method 1000 that is performed in accordance with certain aspects of the present invention. In a block 1020, a data signal is received. Then, in a block 1020, one or more CVs of one or more constellation points is determined; the CV of the constellation is characterized in the block 1020. In a block 1030, one or more bit-soft decision metrics are calculated. Ultimately, in a block 1040, the bit-soft decisions (calculated in the block 1030) are adjusted based on the CVs of the constellation points.

Figure 11:
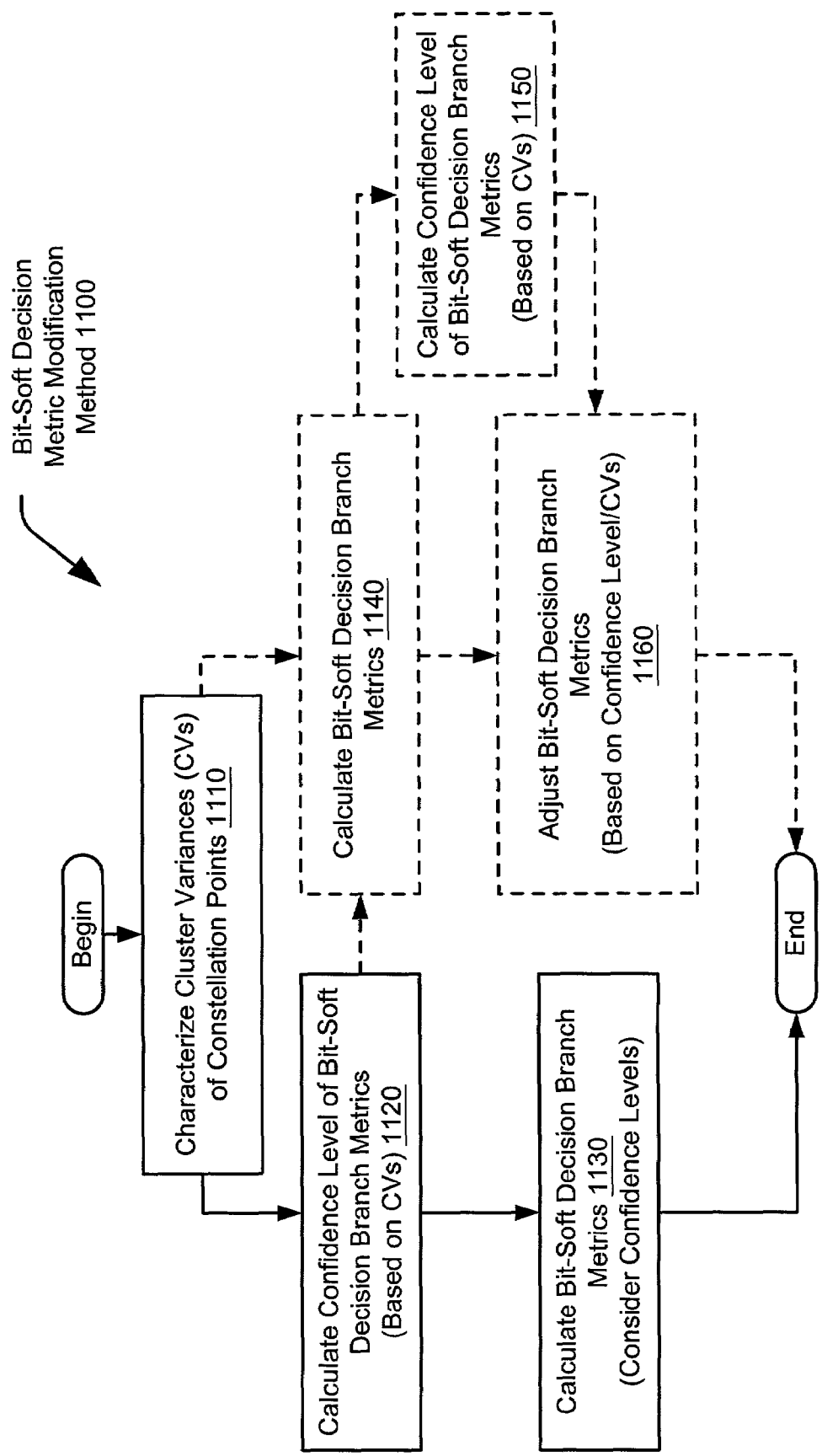
FIG. 11 is a functional block diagram illustrating another embodiment of a bit-soft decision metric modification method that is performed in accordance with certain aspects of the present invention.

FIG. 11 is a functional block diagram illustrating another embodiment of a bit-soft decision metric modification method 1100 that is performed in accordance with certain aspects of the present invention. The FIG. 11 shows some of the several variations in which bit-soft decision metric modification may be performed. Beginning in a block 1110, the CVs of the constellation points are characterized. Afterwards, the manner in which the bit-soft decision branch metrics and the manner in which those bit-soft decision branch metrics may be adjusted are varied.

In one embodiment, the confidence level of the bit-soft decision branch metrics are calculated in a block 1120 based on the CVs of the constellation points. Then, the bit-soft decision branch metrics themselves are calculated in a block 1130 while considering the confidence levels that are calculated in the block 1120.

In an alternative embodiment, the bit-soft decision branch metrics are calculated in a block 1140 after either of the operations within the blocks 1110 or 1120. After performing the operation in the block 1140, one of two paths may be followed. The bit-soft decision branch metrics may themselves be adjusted in a block 1160 based on confidence levels/CVs. In embodiments where the confidence level of the bit-soft decision branch metrics has not yet been calculated, then those confidence levels are in fact calculated in a block 1150 based on the CVs of the constellation points.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. An apparatus, comprising:
a constellation cluster variance characterization circuitry that is operable to characterize a cluster variance of a constellation point within a constellation plane, the constellation point being used to demodulate and decode a received signal; and wherein:
the apparatus is operable to calculate a soft decision metric to assist in the demodulation and decoding of the received signal; and
the apparatus is operable to adjust the soft decision metric based on the characterization of the constellation point within the constellation plane.

2. The apparatus of claim 1, wherein the apparatus is operable to partition the constellation into a plurality of regions based on the characterization of the cluster variance of the constellation point within the constellation.

3. The apparatus of claim 2, wherein:
the plurality of regions comprises an inner and an outer region that extend radially from an origin of the constellation plane;
the inner region lies substantially close to the origin of the constellation plane; and
the outer region lies substantially beyond and substantially surrounds the inner region.

4. The apparatus of claim 1, wherein the constellation cluster variance characterization circuitry is operable to characterize the cluster variance using an analytical process.

5. The apparatus of claim 4, wherein the analytical process comprises determining at least one of a transmitter characteristic, a communication channel characteristic, and a receiver characteristic.

6. The apparatus of claim 5, wherein the at least one of the transmitter characteristic, the communication channel characteristic, and the receiver characteristic is determined using modeling that is performed offline.

7. The apparatus of claim 1, wherein the constellation cluster variance characterization circuitry is operable to characterize the cluster variance of the constellation point within the constellation plane using a learning process, the learning process comprising mapping a plurality of symbols within the received signal to constellation points within the constellation plane.

8. The apparatus of claim 1, wherein:
the constellation cluster variance characterization circuitry is operable to characterize the constellation point within the constellation plane using an analytical process and a learning process, the learning process comprising mapping a plurality of symbols within the received signal to constellation points within the constellation plane; and
the constellation cluster variance characterization circuitry is operable to combine characterization information that is derived using the analytical process and the learning process.

9. The apparatus of claim 1, wherein the apparatus is operable to consider the characterization of the cluster variance of the constellation point within the constellation plane when calculating the soft decision metric.

10. The apparatus of claim 1, wherein the apparatus is a wireless modem indoor unit.

11. The apparatus of claim 1, wherein the apparatus is employed within a communication system that employs vector orthogonal frequency division multiplexing.

12. The apparatus of claim 1, wherein the apparatus is a communication receiver that is employed within a communication system that employs at least one of a QPSK coding scheme, a 16 QAM coding scheme, a 64 QAM coding scheme, a 256 QAM coding scheme, and a 1024 QAM coding scheme.

13. The apparatus of claim 1, further comprising a plurality of antennae that is configured in a spatially diversified manner, each antenna within the plurality of antennae outputs an antenna signal; and wherein:
the apparatus is operable to combine each of the antenna signals into a single signal to generate the received signal.

14. The apparatus of claim 1, wherein the soft decision metric comprises at least one of a bit-soft decision metric and a symbol soft decision metric.

15. The apparatus of claim 1, wherein the cluster variance of the constellation point varies based on a location of the constellation point in the constellation plane.

16. The apparatus of claim 1, wherein:
the apparatus is a multi-tone communication receiver that is operable to employ a data tone and a pilot tone; and
the cluster variance of the constellation point varies based on relative placement of the data tone with respect to the pilot tone.

17. A communication receiver that is operable to adjust a soft decision metric based on a cluster variance of a constellation point within a constellation plane, comprising:
a constellation cluster variance characterization circuitry that is selectively operable either to characterize cluster variances of a plurality of constellation points within a constellation plane or to employ predetermined information comprising the cluster variances of the plurality of constellation points within the constellation plane, the plurality of constellation points being used to demodulate and decode a symbol within a received signal;
wherein the communication receiver partitions the plurality of constellation points into a plurality of regions based on relative cluster variances of the constellation points within the plurality of constellation points, those constellation points having substantially comparable cluster variances being grouped together;
the communication receiver calculates a soft decision metric to assist in the demodulation and decoding of the symbol within the received signal, the demodulation and decoding comprising mapping a received symbol to one of the constellation points within the constellation plane; and
the communication receiver adjusts the soft decision metric based on the region into which the constellation point, that is used to map the received symbol, has been grouped.

18. The communication receiver of claim 17, wherein the plurality of regions, comprising an inner and an outer region, extend radially from an origin of the constellation plane;
the inner region lies substantially close to the origin of the constellation plane; and
the outer region lies substantially beyond and substantially surrounds the inner region.

19. The communication receiver of claim 17, wherein the constellation cluster variance characterization circuitry characterizes the cluster variance using an analytical process.

20. The communication receiver of claim 19, wherein the analytical process comprises determining at least one of a transmitter characteristic, a communication channel characteristic, and a receiver characteristic.

21. The communication receiver of claim 20, wherein the at least one of the transmitter characteristic, the communication channel characteristic, and the receiver characteristic is determined using modeling that is performed offline.

22. The communication receiver of claim 17, wherein the constellation cluster variance characterization circuitry characterizes the cluster variance of the constellation point within the constellation plane using a learning process, the learning process comprising mapping a plurality of symbols within the received signal to constellation points within the constellation plane.

23. The communication receiver of claim 17, wherein the constellation cluster variance characterization circuitry characterizes the constellation point within the constellation plane using an analytical process and a learning process, the learning process comprising mapping a plurality of symbols within the received signal to constellation points within the constellation plane; and
the constellation cluster variance characterization circuitry combines characterization information that is derived using the analytical process and the learning process.

24. The communication receiver of claim 17, wherein the communication receiver considers the characterization of the cluster variance of the constellation point within the constellation plane when calculating the soft decision metric.

25. The communication receiver of claim 17, wherein the communication receiver comprises a wireless modem indoor unit.

26. The communication receiver of claim 17, wherein the communication receiver is employed within a communication system that employs vector orthogonal frequency division multiplexing.

27. The communication receiver of claim 17, wherein the communication receiver is employed within a communication system that employs at least one of a QPSK coding scheme, a 16 QAM coding scheme, a 64 QAM coding scheme, a 256 QAM coding scheme, and a 1024 QAM coding scheme.

28. The communication receiver of claim 17, further comprising a plurality of antennae that is configured in a spatially diversified manner, each antenna within the plurality of antennae outputs an antenna signal; and
the communication receiver combines each of the antenna signals into a single signal to generate the received signal.

29. The communication receiver of claim 17, wherein the soft decision metric comprises at least one of a bit-soft decision metric and a symbol soft decision metric.

30. The communication receiver of claim 17, wherein the cluster variance of the constellation point varies based on a location of the constellation point in the constellation plane.

31. The communication receiver of claim 17, wherein the communication receiver comprises a multi-tone communication receiver employing a data tone and a pilot tone; and
the cluster variance of the constellation point varies based on relative placement of the data tone with respect to the pilot tone.

32. A method, comprising:
characterizing a cluster variance for a plurality of constellation points in a constellation plane;
receiving a data signal;
identifying a candidate constellation point in the constellation plane to perform demodulation and decoding of the received data signal;
calculating a soft decision branch metric associated with the candidate constellation point in the constellation plane; and
adjusting the soft decision branch metric based on the cluster variance of the candidate constellation point in the constellation plane.

33. The method of claim 32, further comprising receiving a plurality of signals using a plurality of antennae that is configured in a spatially diversified manner, each antenna receives one received signal and outputs an antenna signal; and
combining the antenna signals to generate the data signal.

34. The method of claim 32, wherein the characterizing of the cluster variance for the plurality of constellation points in the constellation plane is performed offline using and analytical process.

35. The method of claim 34, wherein the analytical process comprises determining at least one of a transmitter characteristic, a communication channel characteristic, and a receiver characteristic.

36. The method of claim 32, wherein the characterizing of the cluster variance for the plurality of constellation points in the constellation plane is performed using a learning process, the learning process comprising mapping a plurality of symbols within the received signal to constellation points within the constellation plane.

37. The method of claim 32, wherein the characterizing of the cluster variance for the plurality of constellation points in the constellation plane is performed using both an analytical process and a learning process, the learning process comprising mapping a plurality of symbols within the received signal to constellation points within the constellation plane; and
further comprising combining characterization information that is derived using the analytical process and the learning process.

38. The method of claim 32, further comprising considering the characterization of the cluster variance of the constellation point within the constellation plane when calculating the soft decision metric.

39. The method of claim 32, wherein method is performed within a wireless modem indoor unit.

40. The method of claim 32, wherein the method is performed within a communication receiver that is employed within a communication system that employs vector orthogonal frequency division multiplexing.

41. The method of claim 32, wherein the method is performed within a communication receiver that employs at least one of a QPSK coding scheme, a 16 QAM coding scheme, a 64 QAM coding scheme, a 256 QAM coding scheme, and a 1024 QAM coding scheme.

42. The method of claim 32, wherein the soft decision metric comprises at least one of a bit-soft decision metric and a symbol soft decision metric.

43. The method of claim 32, wherein the cluster variance of the constellation point varies based on a location of the constellation point in the constellation plane.

44. The method of claim 32, further comprising employing a data tone and a pilot tone; and
the cluster variance of the constellation point varies based on relative placement of the data tone with respect to the pilot tone.

45. A soft decision metric modification method, comprising:
selectively either characterizing a cluster variance for a plurality of constellation points in a constellation plane or employing predetermined information comprising the cluster variances of the plurality of constellation points within the constellation plane;

partitioning the constellation plane into a plurality of regions, each of the regions having constellation points of substantially comparable cluster variance;

receiving a data signal;

identifying a candidate constellation point in the constellation plane to perform demodulation and decoding of the received data signal;

calculating a soft decision branch metric associated with the candidate constellation point in the constellation plane; and adjusting the soft decision branch metric based on the region into which the candidate constellation point is grouped.

46. The method of claim 45, further comprising receiving a plurality of signals using a plurality of antennae that is configured in a spatially diversified manner, each antenna receives one received signal and outputs an antenna signal; and combining the antenna signals to generate the data signal.

47. The method of claim 45, wherein the characterizing of the cluster variance for the plurality of constellation points in the constellation plane is performed offline using and analytical process.

48. The method of claim 47, wherein the analytical process comprises determining at least one of a transmitter characteristic, a communication channel characteristic, and a receiver characteristic.

49. The method of claim 45, wherein the characterizing of the cluster variance for the plurality of constellation points in the constellation plane is performed using a learning process, the learning process comprising mapping a plurality of symbols within the received signal to constellation points within the constellation plane.

50. The method of claim 45, wherein the characterizing of the cluster variance for the plurality of constellation points in the constellation plane is performed using both an analytical process and a learning process, the learning process comprising mapping a plurality of symbols within the received signal to constellation points within the constellation plane; and further comprising combining characterization information that is derived using the analytical process and the learning process.

51. The method of claim 45, further comprising considering the characterization of the cluster variance of the constellation point within the constellation plane when calculating the soft decision metric.

52. The method of claim 45, wherein method is performed within a wireless modem indoor unit.

53. The method of claim 45, wherein the method is performed within a communication receiver that is employed within a communication system that employs vector orthogonal frequency division multiplexing.

54. The method of claim 45, wherein the method is performed within a communication receiver that employs at least one of a QPSK coding scheme, a 16 QAM coding scheme, a 64 QAM coding scheme, a 256 QAM coding scheme, and a 1024 QAM coding scheme.

55. The method of claim 45, wherein the soft decision metric comprises at least one of a bit-soft decision metric and a symbol soft decision metric.

56. The method of claim 45, wherein the cluster variance of the constellation point varies based on a location of the constellation point in the constellation plane.

57. The method of claim 45, further comprising employing a data tone and a pilot tone; and the cluster variance of the constellation point varies based on relative placement of the data tone with respect to the pilot tone.

* * * * *

UNITED STATES PATENT AND TRADEMARK OFFICE
CERTIFICATE OF CORRECTION

| | | |
|---|---|---|
| PATENT NO. | : 7,136,435 B2 | Page 1 of 1 |
| APPLICATION NO. | : 10/112009 | |
| DATED | : November 14, 2006 | |
| INVENTOR(S) | : Thomas J. Kolze | |

It is certified that error appears in the above-identified patent and that said Letters Patent is hereby corrected as shown below:

Column 18, line 15, in Claim 34: replace "and" with --an--

Column 19, line 24, in Claim 47: replace "and" with --an--

Signed and Sealed this

Twenty-fourth Day of June, 2008

JON W. DUDAS
*Director of the United States Patent and Trademark Office*